United States Statutory Invention Registration [19]

[11] Reg. Number: H339

[43] Published: Oct. 6, 1987

Anderson et al.

[54] SNAP SLIT DOOR WITH OVER PRESSURE RELIEF

[75] Inventors: Robert D. Anderson, Orlando; John Carta, Maitland; John D. Estes, Deland, all of Fla.

[73] Assignee: The United States of America as represented by the Secretary of the Army, Washington, D.C.

[21] Appl. No.: 908,137

[22] Filed: Sep. 11, 1986

[51] Int. Cl.[4] ..... A47H 23/00

[52] U.S. Cl. ..... 160/327

*Primary Examiner*—Harvey E. Behrend
*Assistant Examiner*—Michael J. Carone
*Attorney, Agent, or Firm*—Anthony T. Lane; Harold H. Card, Jr.; Michael C. Sachs

[57] ABSTRACT

A snap slit door having at least one panel and a flat closure means used to create tension in the door panel or panels, such tension acting as the closure force generated by the closure means for the door panel or panels. The flat closure means may be adjustable such that the tension and resulting resistance to opening is variable. Said door panel or panels may be of any pliable material to enable use of the panel or panels without hinges, and further to render the flat closure means operational. The panel or panels may be held in the closed position by any means which will self-release upon the exertion of a requisite pressure differential between the inside and outside of the panel or panels, effectively relieving the pressure differential. One such effective self-releasing closure means is a hook and pile patch arrangement.

7 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SNAP SLIT DOOR WITH OVER PRESSURE RELIEF

GOVERNMENT INTEREST

The United States Government has rights in this invention pursuant to contract No. DAAK-11-8-0-C-0030 awarded by the Department of the Army.

BACKGROUND OF THE INVENTION

This invention relates generally to doors, door panels and door closure means. Many types of doors are known in the prior art; most utilize a handle, a locking mechanism in combination with the handle, and a pair of hinges. Additionally, several other non-essential elements may be utilized, such as a latch, a self-closing mechanism, a window or windows, as well as other components occasionally incorporated into the door. Because of the multitude of moving and non-moving parts, and because of the wide variety of functions which doors are expected to serve, doors are found to exist in infinite variety, each suited to a given set of specific needs.

Doors containing one or a plurality of panels have been used wherein said panels may be comprised of many different materials. Representative examples of materials from which door panels have been made include wood, metal, cloth, plastic, and similar substances. The substance from which such door panels are made is chosen depending upon the functions that each panel is to serve. For example, the material comprising each panel is frequently chosen to provide a secure closure means or to serve as a decorative and durable security device. Alternatively, a panel comprised of screen material can be used where privacy is not required and adequate ventilation is a necessity. Frequently a pair of panels is used, wherein one panel is comprised of any pliable substance, and a second is comprised of a screen. As such, the combination is useful to provide privacy, and adaptable to provide adequate lighting and/or ventilation. Various sizes and shapes of panels have been utilized, depending upon the size of the object passing through the door, the overall dimensions of the system in which the door is contained, the frequency of use, and the durability desired.

Similarly, closure means have been comprised of a variety of materials, including springs, self-closing hinges, pulley means, and mechanical means. The means for closing doors in the prior art have typically been bulky or burdensome, requiring the user to close the door manually or to activate a complicated mechanical device to close the panels. Additionally, such closure means and doors did not open and close quickly to permit fast ingress and egress cycles. Further, such prior art doors and closure means typically did not operate to permit safe equalization of pressure found on both sides of the door, when the pressure differential between sides was extremely great. Rather, a tremendous pressure differential between the sides of a door placed stress and strain upon the material of the door panel, the hinges, the closure mechanism and the locking mechanism. Finally, breakage of one of the above-mentioned components occurred, allowing the pressure to equalize.

SUMMARY OF THE INVENTION

Applicant's invention provides for a door with at least one panel and a flat closure means used to create tension in the door panel or panels, such tension acting as the closing force generated by the closure means for the door panel or panels. Additionally, the invention encompasses a flat closure means which is adjustable in its attachment to the door panel or panels and in its tensional resistance. Using a flat closure means in this manner allows the user to adjust the tension running through the door panel or panels, and as such, a flat spring may be used to create tension through the door panels in more than one door. Applicant's invention does not require the use of hinges, thereby eliminating mechanical parts, as required in the prior art.

OBJECTS OF THE INVENTION

Accordingly, it is one object of this invention to provide an enclosure encompassing a door with at least one door panel which enables ingress and egress by merely holding the panel or panels in an open position, and passing through the opening.

Further objects of this invention include an enclosure encompassing a door comprised of any pliable material to allow fast ingress and egress cycles, eliminate the requirement for hinges, have fewer moving parts and not injure a person or damage material passing through the opening of the door if such person or material comes into contact with the door.

A further object of this invention is to provide a door comprised of at least one panel, thereby enabling a user or object to create an opening between the panel and the door frame or between two panels and to pass through the opening.

A yet further object of this invention is to provide an enclosure encompassing a door which need not be mounted on hinges, thereby reducing the number of moving parts involved, and for such a door to further comprise a side wall of a container, thereby enabling a person or an object to pass into or out of a container.

The preferred embodiment of Applicants' invention as disclosed herein will be described in greater detail below with reference to the drawings, wherein.

DETAILED DESCRIPTION OF THE DRAWINGS

Referring in detail to the drawings, Applicants' invention encompasses a door designated generally as 10, having at least one panel 11 and a flat closure means 14.

The panel or panels 11 utilized in Applicants' invention are typically made from any pliable material. Pliable material is preferred to enable the panels to be spread by the user to an open position, thereby allowing ingress and/or egress. When a single panel is used the pliable nature of the door panel is useful for enabling the single panel 11 to be held in its open position apart from the door frame (not shown), for simple ingress and/or egress. Any such pliable material may be utilized which provides the user with the preferred properties in the door 10. For example, a waterproof material may be utilized to prevent moisture or dampness from permeating the material contained within and protected by the inside of the door panel 11 or panels, or from rendering a person protected by the panel 11 wet and uncomfortable. If desired, any plastic, cloth, canvas, rubber or similar material may be used for waterproof paneling. Alternatively, a non-waterproof material such as a cotton-type cloth coated with a rubber or plastic compound or a sealant may be suitable to prevent moisture from permeating the protected area.

Figure 1:
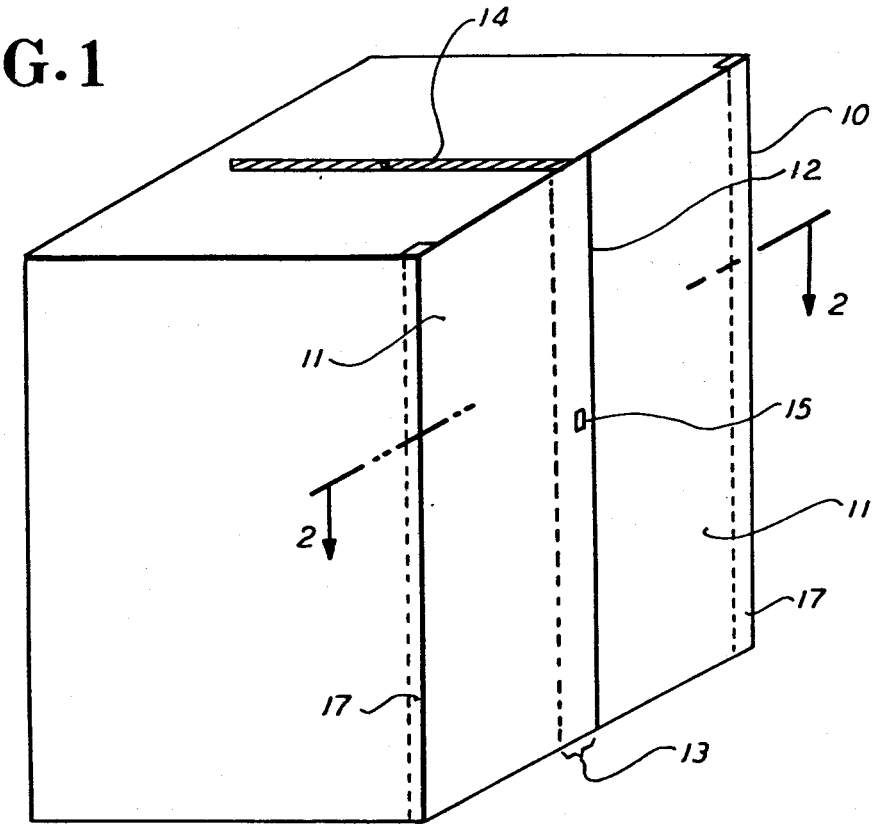
FIG. 1 is a front prespective view of the snap slit door.
Figure 2:
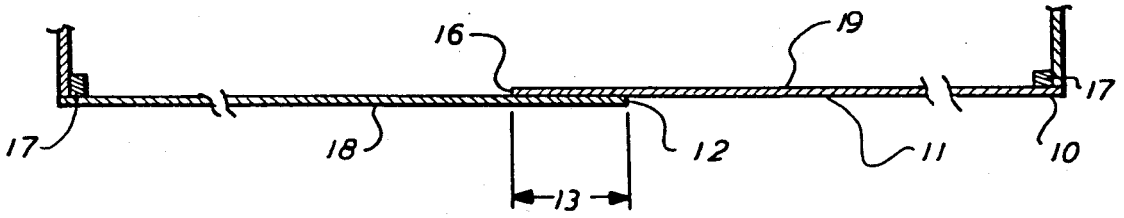
FIG. 2 is cross sectional view of the panels of the snap-slit door, as seen from line 2—2 in FIG. 1; and, FIG. 3 is an exploded view of the preferred embodiment of Applicants' invention, utilizing a pair of snap slit doors.

The panel or panels 11 typically are attached to a rigid member 17, the point of attachment serving as a portion of the overall support for each panel 11, similar to a door frame and hinge mechanism. Said rigid member 17 may be enclosed within the confines of a system, as shown generally in FIG. 1. Alternatively, rigid means 17 may be directly adjacent to the panels 11 and located outside of the confines of the enclosed system, as shown generally in FIG. 3. However, it is to be understood that rigid member 17 should either be unattached to the panel or panels 11 at the top, or may be sufficiently bendable so as to enable the panel or panels 11 to assume an open position when held in the open position during ingress or egress. Attachment of the panel or panels 11 at the uppermost portion of the rigid member 17 limits the utility of Applicants' invention by greatly reducing the extent to which panel or panels 11 will assume an open position.

In the preferred embodiment of Applicant's invention, a pair of panels 11 is further described as comprising an outside panel 18 and an inside panel 19. It is to be understood, however, that the designations "outside" and "inside" refer to panel overlapping region 13 rather than the entire surface of each panel 11. The dimensions of the panel overlapping region 13 are variable within wide limits, depending upon the size of the panels 11, and placement of the rigid member 17 supporting each panel 11. For example, outside panel 18 having an outer edge 12 may overlap the inside panel 19, having an inner edge 16 by approximately two (2) inches, generally creating a panel overlapping region 13 two inches wide and running essentially for the entire vertical length of said panels 11. Alternatively, the pair of panels 11 may each be hung from a rigid support member 17 so as to cause the respective panels to overlap in a panel overlapping region 13 which does not run essentially the length of said panels 11. Rather, panels 11 may each be supported by a rigid member 17 so as not to overlap, or to overlap on angle, if rigid support members 17 are not positioned parallel to each other.

A flat closure means 14 is used to place tension upon panels 11, and to keep panels 11 in a stable position in relation to one another by attaching to the outside panel 18 and/or to the inside panel 19. The flat closure means may optionally be attached to either or both such panels 11 within the confines of the panel overlapping region 13. Attachment in this manner provides tension through the material of each panel 11, primarily at the outer panel edge 12 and inner panel edge 16 of each respective panel 11, as well as through each panel in the overlapping region 13. Preferably, flat closure means 14 is in the shape of a spring, such as a flat leaf spring, bearing sufficient strength to provide adequate tension through panels 11, and causing such panels 11 to return to their closed position after being manually separated for ingress and/or egress. Such a flat leaf spring may provide for adjustment of the tension embodied in each panel 11, or of the tensional strength of said flat leaf spring, which, in turn adjusts the tension in each panel 11.

Further, the flat leaf spring attached to the panel or panels 11 functions as a self-closing mechanism and as an overpressure relief system. When a container with the snap slit door 10 therein develops internal pressure sufficiently greater than the atmospheric pressure surrounding the container, such internal overpressure causes panels 11 to separate at panel overlapping region 13, thereby allowing said external and internal pressure to equilibrate. The pressure at which said panels 11 will separate is dependent upon the rigidity and/or tensional strength of the flat closure means 14, the tension bourne by each of the panels 11 and the resistance to overpressure relief provided by a securing means 15.

To further provide resistance to internal and external pressure equilibration, and to essentially maintain the panels 11 in a closed state, Applicant's invention further encompasses a securing means 15. Securing means 15 can be any means useful for securing the outside panel 18 to the inside panel 19, or the panel 11 to rigid member 17. As such, a hook and pile patch, commonly known as Velcro ® is ideal. Alternative securing means 15 are possible and within the scope of this invention, and include snaps, buttons and similar devices which will unfasten when a significant overpressure differential develops.

To utilize Applicant's invention for ingress and/or egress, the outer edge 12 of the outside panel 18 and the inner edge 16 of the inside panel 19 may be grasped or otherwise physically separated to hold said panel or panels 11 in an open position, so that an object or individual may pass through the opening created between the panels 11. Opening the panels in this manner increases the tension on said panels 11 in the panel overlapping region 13, caused by bending the flat closure means 14. When the respective edges of the outside and inside panels 18 and 19 are released, the flat closure means 14 returns to its normal position, thereby causing the panels 11 to close automatically upon such release. While the preferred embodiment of Applicants' invention utilizes vertical panels 11 which serve to define a vertical slit between the panels 11, it is possible and within the scope of Applicants' invention to utilize the panels 11 in a horizontal position, which then define a horizontal slit between them.

Figure 3:
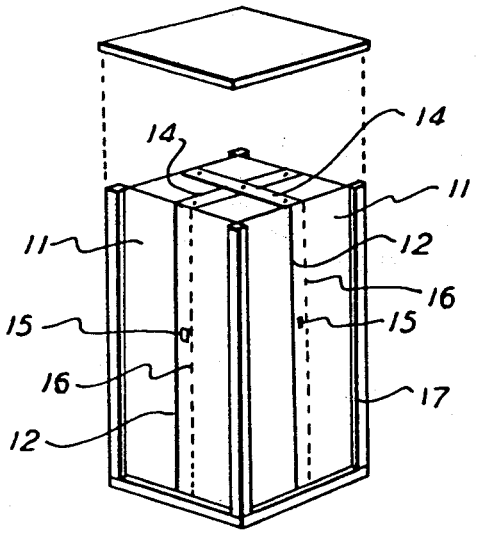

Similarly, it is possible and within the scope of Applicants' invention to utilize mulitple sets of panels 11 to define multiple snap slip doors 10 as shown generally in FIG. 3.

Figure 4:
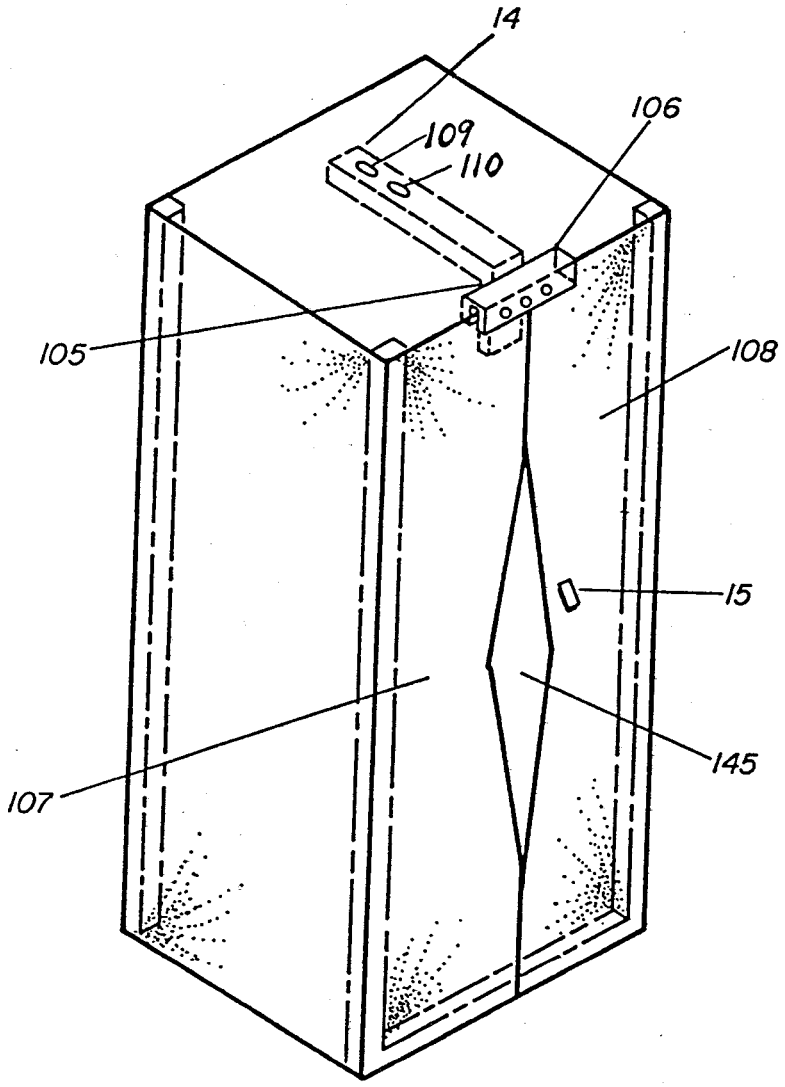
FIG. 4 shows a detail view of the closure system.

FIG. 4 illustrates the spring arrangement in more detail. It is explained that doors 11 and 12 are actually made of cloth fabric or carpeting or the like in one embodiment for the closure means. It is used as an airlock (antechamber) for entry into a main building which is meant to be isolated from the outside environment, as for one example from the dust in the outside world. After one enters this antechamber and the front doors close back behind him, then the chamber can be pumped out, to remove contaminants in the atmosphere. After everything is satisfactory, then the person can go out the back doors of this antechamber, and on into the main building where, for example, semiconductors may be under manufacture in a dust free environment. Another possible use is for a hospital operating room entry means.

Figure 5:
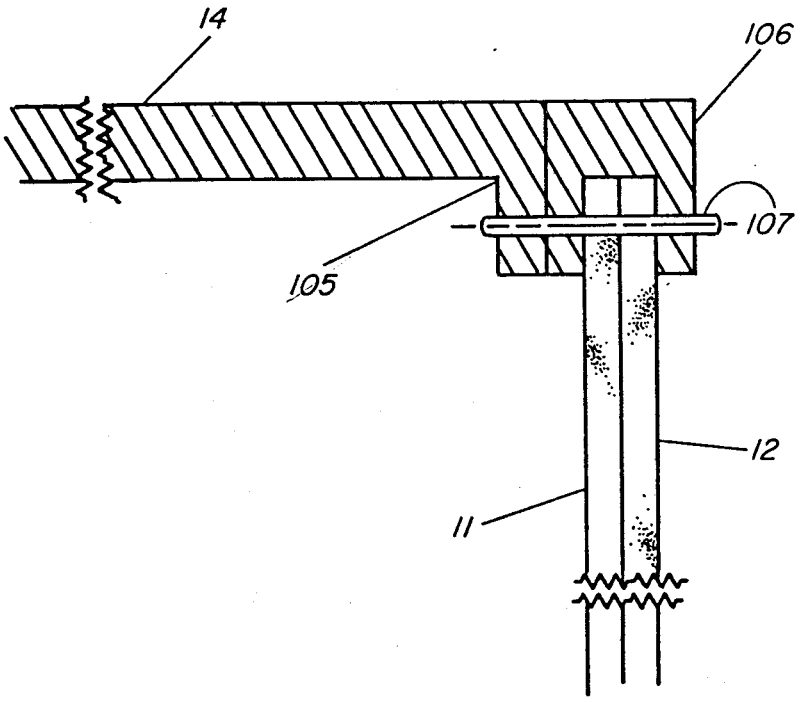
FIG. 5 shows details of the door-to-leaf spring attachment.

As the person enters this antechamber by spreading the fabric pieces, 11 and 12 into an area, he is actually pulling down on leaf spring 14, which itself is attached to the ceiling frame. He may use a handle if he wishes. The pulling action is because the fabrics are held sandwiched in by (aluminum or other) piece 106 (which could run the whole width of the fabrics, or less if desired), through which is also riveted (or otherwise connected) to the leaf spring. The spring, it is explained, is a flat piece of steel (or other springy material) which is curved at its end (or bent 90° such as at corner 105) to provide an end surface for attachment to said fabrics. The fabrics are firmly attached all along their base areas (to, for example, the base frame of the enclosure). Since the fabrics 11 and 12 are arranged to be completely taut before they are spread open, the opening action actually translates into a "pulling down" action upon the leaf spring. Once the person releases the fabrics, as when already inside, the leaf spring causes the fabrics to resume their taut position again. A version of FIG. 4 has been successfully used under a development program by the inventors herein. FIG. 5 shows part 106 in more detail, as connected to leaf spring and cloth doors. Pieces 105 and 106 may be of one piece; rivetting 107 may be replaced by other attachment methods. A perfect 90° bend on spring 14 is also not necessary.

While Applicants have described what is believed to be the preferred embodiment of their invention, other alternative embodiments will be obvious from the teachings herein. Consequently, the scope of Applicants' invention is not to be limited hereby.

What is claimed is:

1. A snap slit door comprising:

at least one panel having an edge;

a rigid member attached to each panel opposite the edge; and a flat closure means attached to at least one panel adjacent the edge.

2. The snap slit door of claim 1 further comprised of an inside panel and an outside panel.

3. The snap slit door of claim 1 wherein the flat closure means is further comprised of a flat spring.

4. The snap slit door of claim 3 wherein the flat closure means is further comprised of a flat leaf spring.

5. The snap slit door of claim 4 wherein the flat leaf spring is adjustable.

6. The snap slit door of claim 5 wherein the flat closure means is attached to the inside panel and the outside panel.

7. The snap slit door of claim 5 wherein the flat leaf spring is adjustable to provide overpressure relief.

* * * * *